(12) United States Patent
Kamepalli et al.

(10) Patent No.: US 10,852,844 B1
(45) Date of Patent: Dec. 1, 2020

(54) CONFIGURING THE LAYOUT OF A KEYBOARD USING GESTURES

(71) Applicant: Dell Products, L.P., Round Rock, TX (US)

(72) Inventors: Srinivas Kamepalli, Austin, TX (US); Deeder M. Aurongzeb, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 26 days.

(21) Appl. No.: 16/408,248

(22) Filed: May 9, 2019

(51) Int. Cl.
*G06F 3/02* (2006.01)
*G06F 3/01* (2006.01)

(52) U.S. Cl.
CPC ............ *G06F 3/0219* (2013.01); *G06F 3/017* (2013.01); *G06F 3/021* (2013.01)

(58) Field of Classification Search
None
See application file for complete search history.

(56) References Cited

U.S. PATENT DOCUMENTS

| | | | | |
|---|---|---|---|---|
| 2014/0028567 A1* | 1/2014 | Park | .................. | G06F 3/017 345/168 |
| 2014/0118263 A1* | 5/2014 | Tajima | ............... | G06F 3/04895 345/168 |
| 2014/0191972 A1* | 7/2014 | Case | ..................... | G06F 3/0489 345/168 |
| 2014/0365957 A1* | 12/2014 | Louch | ................ | G06F 3/04817 715/790 |
| 2018/0136737 A1* | 5/2018 | Amarilio | ............... | H05B 45/10 |
| 2019/0294258 A1* | 9/2019 | Forlines | ............... | G06F 3/0234 |

* cited by examiner

*Primary Examiner* — Roy P Rabindranath
(74) *Attorney, Agent, or Firm* — Fogarty LLP

(57) ABSTRACT

Systems and methods for configuring the layout of a hovering keyboard using gestures are described. In some embodiments, an Information Handling System (IHS) may include a processor and a memory coupled to the processor, the memory having program instructions stored thereon that, upon execution by the processor, cause the IHS to: detect a hand gesture using proximity sensors disposed on a hovering keyboard coupled to the IHS, and configure a layout of the hovering keyboard based on the detection.

17 Claims, 6 Drawing Sheets

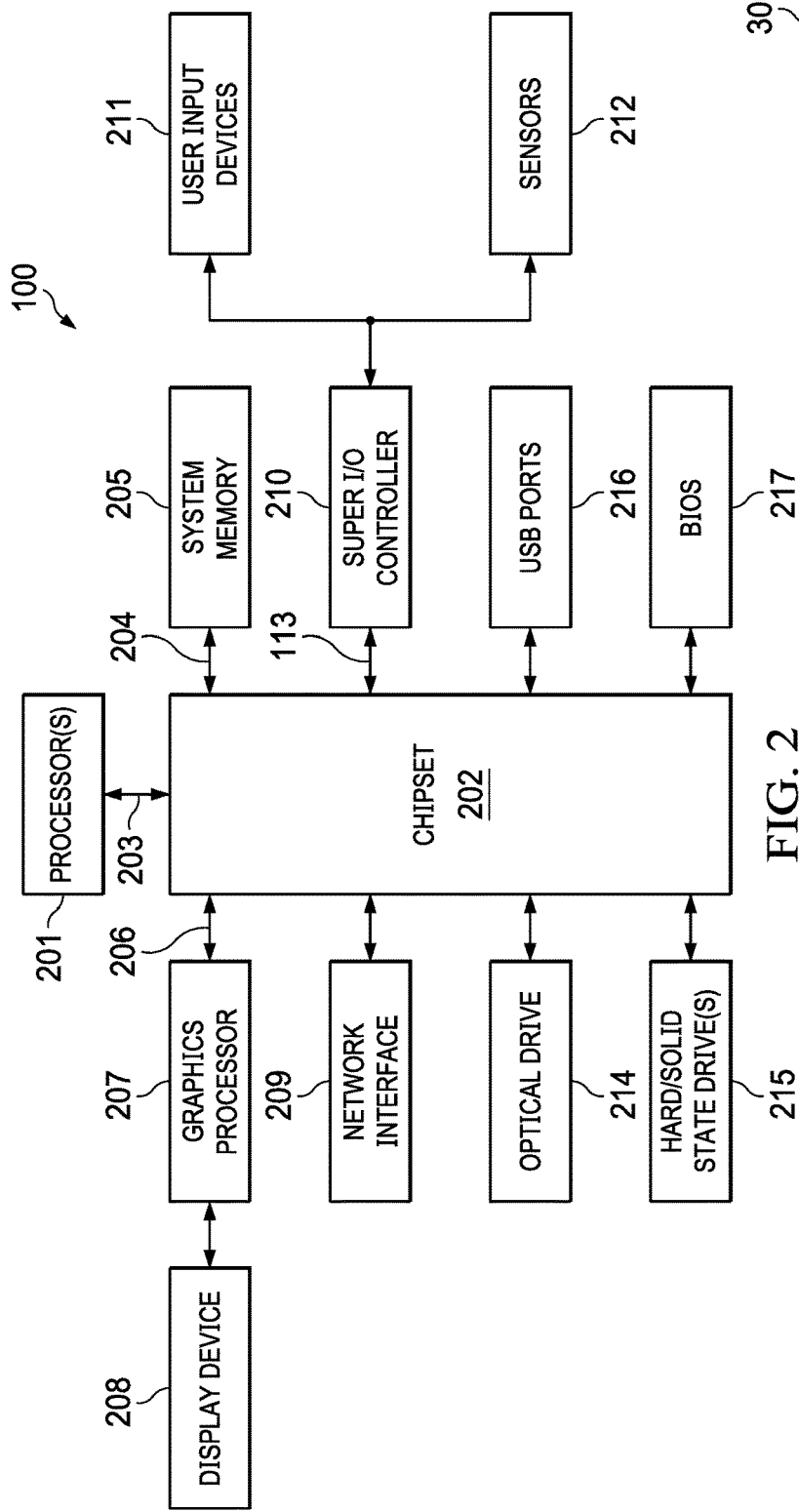
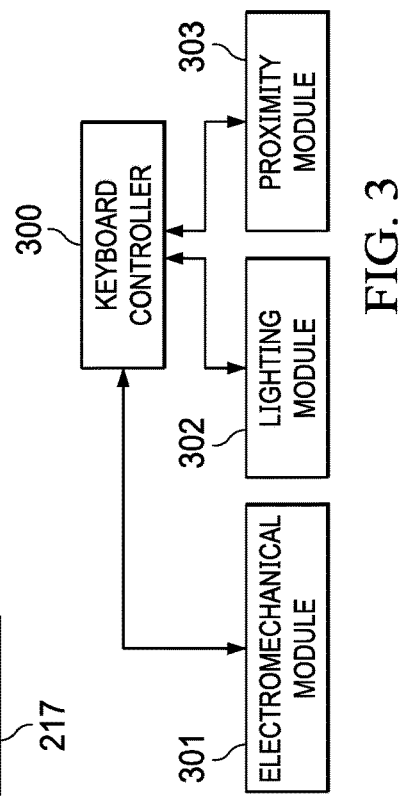

CONFIGURING THE LAYOUT OF A KEYBOARD USING GESTURES

FIELD

This disclosure relates generally to Information Handling Systems (IHSs), and more specifically, to systems and methods for configuring the layout of a hovering keyboard using gestures.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In various implementations, IHSs process information received via a keyboard. A conventional keyboard includes components such as scissor switch keys, dome switch keys, levers, membranes, bucking springs, etc. These components are configured to receive physical keystrokes when a user actually touches and/or presses the keyboard's keys.

In addition, certain types of keyboards now also come equipped with proximity sensors. These proximity sensors are configured to measure distances between the user's hand or fingers to the keyboard. In operation, such a keyboard can detect signals representative of proximity and, when appropriate, it can interpret them as "hovering keystrokes"—even in the absence of physical contact between the keyboard and the user's fingers.

SUMMARY

Embodiments of systems and methods for configuring the layout of a hovering keyboard using gestures are described. In an illustrative, non-limiting embodiment, an Information Handling System (IHS) may include a processor and a memory coupled to the processor, the memory having program instructions stored thereon that, upon execution by the processor, cause the IHS to: detect a hand gesture using proximity sensors disposed on a hovering keyboard coupled to the IHS, and configure a layout of the hovering keyboard based on the detection.

To detect the hand gesture, the program instructions, upon execution, may cause the IHS to fit proximity data obtained by the proximity sensors to a geometric model of a hand. In some cases, the geometric model may include a partial virtual skeleton of the hand having one or more parameters selected from the group consisting of: a length, a width, a joint position, an angle of joint rotation, and a finger segment.

For example, the hand gesture may include a swipe. To configure the layout, the program instructions, upon execution, further cause the IHS to map a key selected by a user to a corresponding command.

To configure the layout, the program instructions, upon execution, may cause the IHS to detect hovering keystrokes to the exclusion of physical keystrokes. Additionally, or alternatively, to configure the layout, the program instructions, upon execution, further cause the IHS to detect physical keystrokes to the exclusion of hovering keystrokes. Additionally, or alternatively, to configure the layout, the program instructions, upon execution, further cause the IHS to detect physical keystrokes and hovering keystrokes concurrently. Additionally, or alternatively, to configure the layout, the program instructions, upon execution, further cause the IHS to map a first hovering keystroke over a first keycap to a first application executed by the IHS, and to map a second hovering keystroke over a second keycap to a second application executed by the IHS.

In some cases, the first application may be rendered on a display integrated into the IHS, and wherein the second application may be rendered on an external display.

To configure the layout, the program instructions, upon execution, may cause the IHS to map a hovering keystroke over a given keycap to a first application executed by the IHS, and to map a physical keystroke of the given keycap to a second application executed by the IHS. Additionally, or alternatively, to configure the layout, the program instructions, upon execution, cause the IHS to enable hovering keystrokes over a first a subset of keycaps and disable hovering keystrokes over a second subset of keycaps. Additionally, or alternatively, to configure the layout, the program instructions, upon execution, may cause the IHS to enable or disable a lighting effect provided via a backlight illumination layer of the hovering keyboard.

In another illustrative, non-limiting embodiment, a method may include detecting a hand gesture using proximity sensors disposed on a hovering keyboard coupled to an IHS, and configuring a layout of the hovering keyboard based on the detection. For example, detecting the hand gesture may include fitting proximity data obtained by the proximity sensors to a partial virtual skeleton of the hand having one or more parameters selected from the group consisting of: a length, a width, a joint position, an angle of joint rotation, and a finger segment.

In some cases, configuring the layout may include configuring the hovering keyboard to detect one of: (i) hovering keystrokes only, (ii) physical keystrokes only, or (iii) physical keystrokes and hovering keystrokes concurrently. Additionally, or alternatively, configuring the layout may include mapping a hovering keystroke over a given keycap to a first application executed by the IHS and mapping a physical keystroke of the given keycap to a second application executed by the IHS. Additionally, or alternatively, configuring the layout may include enabling hovering keystrokes over a first a subset of keycaps and disabling hovering keystrokes over a second subset of keycaps. Additionally, or alternatively, configuring the layout may include selecting a color or an intensity of a light provided by a backlight illumination layer of the hovering keyboard.

In yet another illustrative, non-limiting embodiment, a hardware memory device may have program instructions stored thereon that, upon execution by a processor of an IHS, cause the IHS to: detect a hand gesture using proximity sensors disposed on a hovering keyboard coupled to the IHS; and configure a layout of the hovering keyboard based on the detection.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 2 is a block diagram of electronic components of an IHS, according to some embodiments.

FIG. 3 is a block diagram of electronic components of a hovering keyboard, according to some embodiments.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
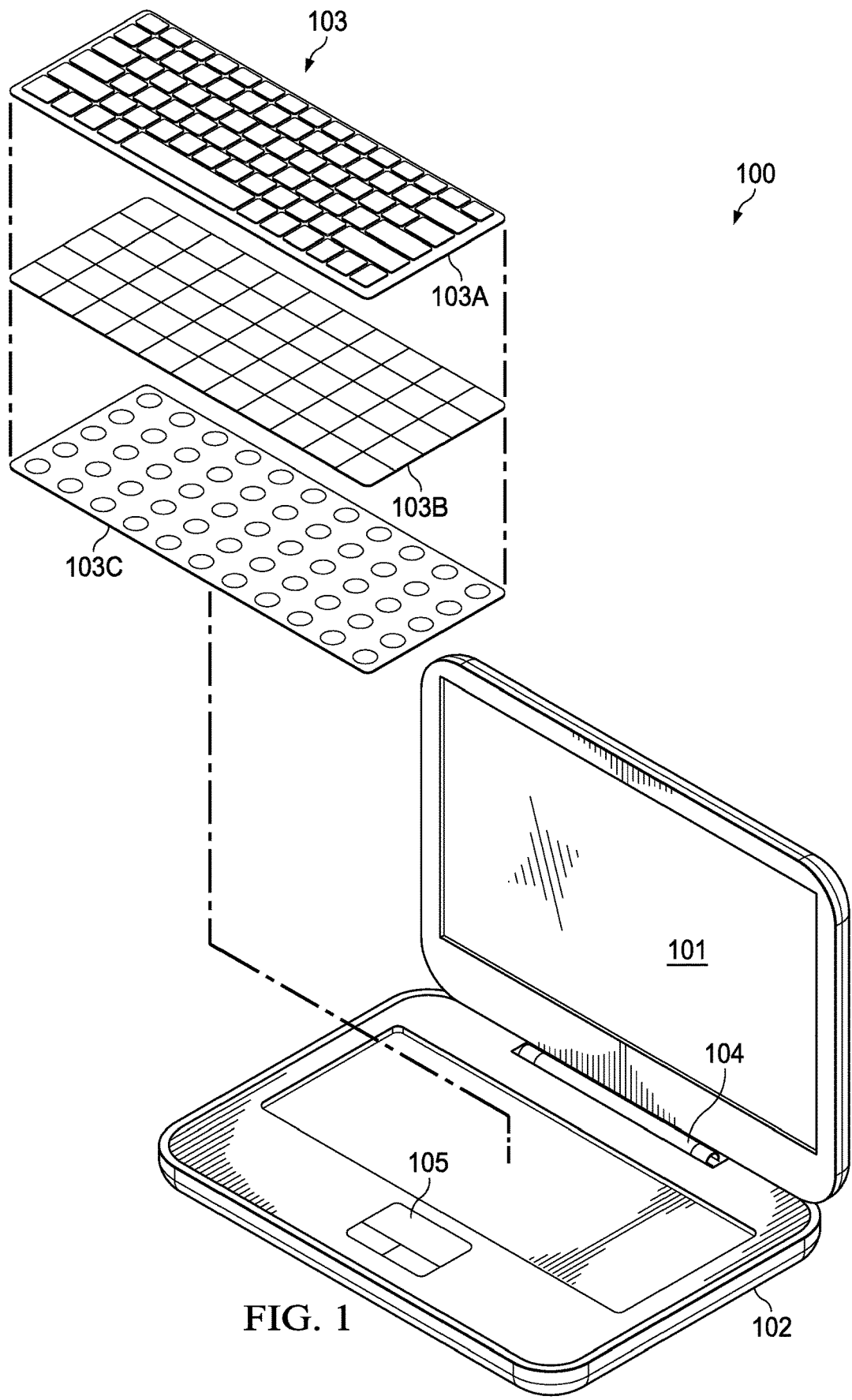
FIG. 1 is a perspective view of an Information Handling System (IHS) with a hovering keyboard, according to some embodiments.

FIG. 1 is a perspective view of Information Handling System (IHS) 100 with hovering keyboard 103. In this illustrative, non-limiting embodiment, IHS 100 includes display 101 and base or chassis 102, coupled to each other via hinge 104. Chassis 102 includes trackpad 105 or the like, and it holds keyboard 103. In this implementation, IHS 100 has a laptop or notebook form factor, such that keyboard 103 is directly integrated thereto. In other implementations, however, IHS 100 may be a desktop computer, video game console, appliance, etc., and keyboard 103 may be a peripheral keyboard separate from IHS 100. In those cases, keyboard 103 may be coupled to IHS 100 via a cable or wire (e.g., over a PS/2 connector, USB bus, etc.) or wirelessly (e.g., Bluetooth). Inputs made at keyboard 103 are communicated to keyboard controller 300 (shown in FIG. 3) for use by IHS 100.

In this example, hovering keyboard 103 is depicted with three layers or membranes: an electromechanical layer 103A, backlight illumination layer 103B, and proximity sensing layer 103C. When hovering keyboard 103 is assembled, layers 103A-C are stacked on top of each other to operate as follows: Electromechanical layer 103A is where keycap assemblies reside, and it is configured to detect physical keypresses against key caps; backlight illumination layer 103B comprises a plurality of LEDs configured to illuminate key caps from the bottom up; and proximity sensing layer is configured to detect hovering keypresses, such that in some cases, a finger's proximity to a key cap, without actually touching it, can also be detected as a keypress.

In other hovering keyboard implementations, the order in which layers 103B and 103C are stacked may be different than what is shown in FIG. 1. In some cases, layers 103A-C may be combined: for example, layers 103B and 103C may be provided as a single membrane.

With respect to electromechanical layer 103A, key caps extend out of an upper surface of keyboard 103 to provide a user with selectable inputs based upon the characters associated with the keys, such as a QWERTY keyboard that provides ASCI binary code inputs to the keyboard controller. A membrane disposed beneath keys may detect key inputs and generate a signal unique to each key. The membrane may be, for example, a flexible printed circuit board with wirelines that feed to a cable so that key inputs may be uniquely identified. Lever structures may be disposed below the keycaps to bias the keys in an upwards direction. End users provide inputs by pressing on keys to overcome the bias of these lever structures, to thereby impact the membrane.

As a person of ordinary skill in the art will recognize, hovering keyboard 103 may have a variety suitable of structures for placement of keys as individual caps (or assembled as one part) and for biasing keys (such as springs, magnets, and/or other types of devices).

Electromechanical layer 103A provides a grid of circuits underneath the keys of keyboard 103 that forms an N×M matrix. These circuits are configured to generate signals in response to the user pressing the keys. For example, the circuits may be broken underneath the keys such that, when a user depresses a given key, the electric circuit underneath that key is completed. Keyboard controller 300 receives a signal output by that circuit and compares the location of the circuit to a character map stored in its memory to determine which key was physically pressed.

Backlight illumination layer 103B may include an Organic Light Emitting Diode (OLED) material, such as an OLED film that is selectively powered with an electrical current under the control of keyboard controller 300. The OLED film be disposed at various locations of keyboard's structure in order to obtain desired illumination at selected keys. For example, the OLED film may be deposited directly on electrical contacts of membrane 103B so that a controller may selectively illuminate OLED film under any keycap, by applying an electrical current to it. In some cases, backlight illumination layer 103B may further include a lightguide structure or the like, configured to route light from its LED source to a particular keycap through keyboard 103.

Proximity sensing layer 103C provides keyboard 103 with the ability to detect keypresses without the end user making physical contact with key caps. The proximity sensors of sensing layer 103C may comprise any of a number of different types of known sensors configured to measure a distance or proximity of an object, and to produce corresponding signals in response. In some implementations, proximity sensors may overlay or lie underneath the keys of hovering keyboard 103. In other implementations, sensors may be integrated within each respective key.

In the embodiment of FIG. 1, the proximity sensors may include a grid of sensors underneath the keys of keyboard 103 disposed on layer 103C. The proximity sensors may be capacitive sensors configured such that their electric fields (sensing fields) are directed through the key caps and upward from the top surface keyboard 103. The proximity sensors are configured to detect an object such as a user's fingers, and to produce signals representative of the proximity of the object. Keyboard controller 300 may process these signals to determine the position and/or movement of the detected object relative to the proximity sensors, and to capture inputs having certain characteristics as corresponding hovering keystrokes.

In some implementations, the detection of hovering keystrokes via proximity sensing layer 103C may take place in addition, or as an alternative to, the concurrent detection of physical keystrokes by electromechanical layer 103A.

FIG. 2 is a block diagram of components of IHS 100. Particularly, IHS 100 may include one or more processors 201. In various embodiments, IHS 100 may be a single-processor system including one processor 201, or a multi-processor system including two or more processors 201. Processor(s) 201 may include any processor capable of executing program instructions, such as an INTEL PENTIUM series processor or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 202 that may have one or more integrated circuits coupled to processor(s) 201. In certain embodiments, the chipset 202 may utilize a DMI (Direct Media Interface) or QPI (QuickPath Interconnect) bus 203 for communicating with processor(s) 201.

Chipset 202 provides processor(s) 201 with access to a variety of resources. For instance, chipset 202 provides access to system memory 205 over memory bus 204. System memory 205 may be configured to store program instructions and/or data accessible by processors(s) 201. In various embodiments, system memory 205 may be implemented using any suitable memory technology, such as static RAM (SRAM), synchronous dynamic RAM (SDRAM), nonvolatile/Flash-type memory, or any other type of memory.

Chipset 202 may also provide access to graphics processor 207. In certain embodiments, graphics processor 207 may be part of one or more video or graphics cards that have been installed as components of IHS 100. Graphics processor 207 may be coupled to chipset 202 via graphics bus 206 such as provided by an Accelerated Graphics Port (AGP) bus, or a Peripheral Component Interconnect Express (PCIe) bus. In certain embodiments, graphics processor 207 generates display signals and provides them to display device 208. In certain embodiments, display device 208 may be a touch-sensitive display.

In some implementations, chipset 202 may also provide access to one or more user input devices 211. For instance, chipset 202 may be coupled to super I/O controller (SIO) 210 or an embedded controller (EC) via eSPI (Enhanced Serial Peripheral Interface) or Low-Pin Count (LPC) bus 213, and SIO 210 may provide interfaces for a variety of user input devices 211 (e.g., lower bandwidth and low data rate devices). Particularly, SIO 210 may provide access to keyboard 103 and a mouse, or other peripheral input devices such as keypads, biometric scanning devices, and voice or optical recognition devices.

SIO 210 may also provide an interface for communications with one or more sensor devices 212, which may include environment sensors, such as a temperature sensor or other cooling system sensors. These I/O devices, such as user input devices 211 and sensor devices 212, may interface with SIO 210 through wired or wireless connections.

Other resources may also be coupled to processor(s) 201 of IHS 100 through chipset 202. For example, chipset 202 may be coupled to network interface 209, such as a Network Interface Controller (NIC). In certain embodiments, network interface 209 may be coupled to chipset 202 via a PCIe bus. Network interface 209 may support communication via various wired and/or wireless networks.

Chipset 202 may also provide access to one or more hard disk and/or solid state drives 215. In certain embodiments, chipset 202 may also provide access to one or more optical drives 214 or other removable-media drives. Any or all of drive devices 214 and 215 may be integral to IHS 100, or they may be located remotely. Chipset 202 may also provide access to one or more Universal Serial Bus (USB) ports 216.

In certain implementations, chipset IHS 202 may support an $I^2C$ (Inter-Integrated Circuit) bus that may be used to communicate with various types of microcontrollers, microprocessor and integrated circuits that are typically integrated components of the motherboard of the IHS 100 and perform specialized operations. For example, such an $I^2C$ bus may be utilized to transmit and receive keystroke and hovering keystroke information from an attached keyboard device, and to provide that information to an operating system (OS) executed by IHS 100.

Another resource that may be accessed by processor(s) 201 via chipset 202 is Basic Input/Output System (BIOS) 217. Upon booting of IHS 100, processor(s) 201 may utilize BIOS 217 instructions to initialize and test hardware components coupled to IHS 100 and to load an OS for use by IHS 100. BIOS 217 provides an abstraction layer that allows the OS to interface with certain hardware components that are utilized by IHS 100. The Unified Extensible Firmware Interface (UEFI) was designed as a successor to BIOS; many modern IHSs utilize UEFI in addition to or instead of a BIOS. As used herein, BIOS is also intended to encompass UEFI.

Chipset 202 may also provide an interface for communications with one or more sensors 212. Sensors 212 may be disposed within display 101, chassis 102, keyboard 103, hinge 104, and/or trackpad 105, and may include, but are not limited to: electric, magnetic, radio, optical, infrared, thermal, force, pressure, acoustic, ultrasonic, proximity, position, deformation, bending, direction, movement, velocity, gyroscope, rotation, and/or acceleration sensor(s).

In various embodiments, keyboard controller 300 (shown in FIG. 3) may utilize different interfaces for communicating with the OS of IHS 100. For instance, keyboard controller 300 may interface with the chipset 202 via super I/O controller 210.

FIG. 3 is a block diagram of electronic components of hovering keyboard 103. As depicted, components of keyboard 103 include keyboard controller or processor 300 coupled to electromechanical module 301, lighting module 302, and proximity module 303. Each of modules 301-303 may include electronic circuits and/or program instructions that enable that module to communicate with keyboard controller 300.

Electromechanical module 301 may be used to control the operation of and/or to detect events originated by electromechanical layer 103A, lighting module 302 may be used to control the operation of backlight illumination layer 103B, and proximity module 303 may be used to control the operation of and/or to detect events originated by proximity sensing layer 103C. In other implementations, an additional wireless communication module (not shown) may be coupled to keyboard controller 300 to enable communications between keyboard 103 and IHS 100 using a suitable wireless protocol.

Keyboard controller 300 may be configured to detect and identify individual physical keypresses or keystrokes made by the end user via electromechanical layer 103A. Keyboard controller or processor 300 may also be configured to control the operation of each individual LED of backlight illumination layer 103B using parameters such as, for example, a selected location (e.g., in an N×M matrix, as an identified key or set of keys, etc.), a selected color (e.g., when the backlight includes RGB LEDs), and a selected intensity (e.g., brighter or dimmer). In addition, keyboard controller 300 may be configured to detect and identify individual hovering keypresses made by the end user via proximity sensing layer 103C.

In various embodiments, IHS 100 and/or hovering keyboard 103 may not include all of components shown in FIGS. 2 and 3, respectively. Additionally, or alternatively, IHS 100 and/or hovering keyboard 103 may include components in addition to those shown in FIGS. 2 and 3, respectively. Additionally, or alternatively, components represented as discrete in FIGS. 2 and 3 may instead be integrated with other components. For example, all or a portion of the functionality provided by these various components may be provided as a System-On-Chip (SOC), or the like.

Figure 4:
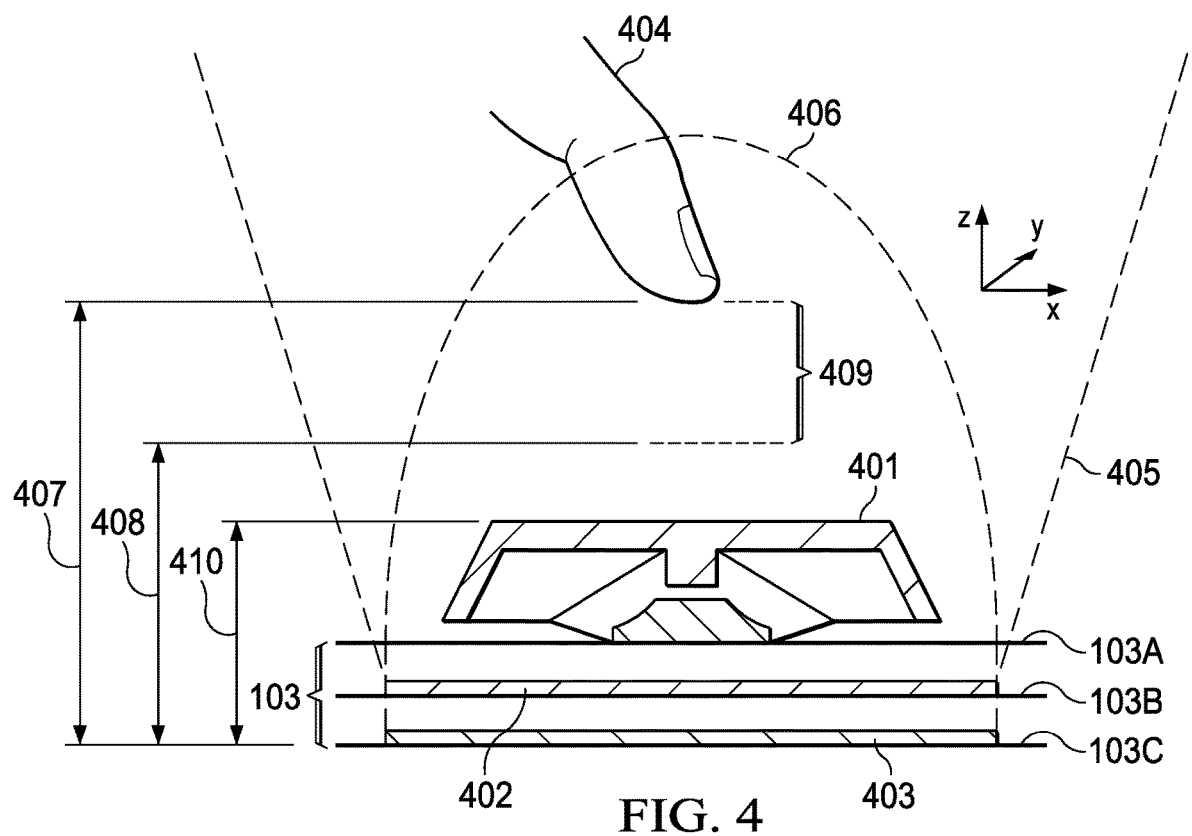
FIG. 4 is sectional view of a hovering keyboard in operation, according to some embodiments.

FIG. 4 is sectional view of hovering keyboard 103 in operation, according to some embodiments. As depicted, hovering keyboard 103 includes electromechanical layer 103A, backlight illumination layer 103B, and proximity sensing layer 103C. Electromechanical layer 103A hosts a key assembly, which includes keycap 401 as well as a dome, switches, and/or levers configured to receive and capture physical keystrokes.

Backlight illumination layer 103B includes lighting element 402 under key assembly 401. Illumination element 402 may include one or more LEDs (or one or more transparent areas from where light can exist a light guide, for example) that are configured to shine light 405, using one or more selected parameters (e.g., color, intensity, etc.), under keycap 401. In some cases, element 402 may be disposed in a matrix of like elements as part of backlight illumination layer 103B, each element located under a corresponding key of electromechanical layer 103A.

Proximity sensing layer 103C includes proximity sensor 403 under key assembly 401, such as a capacitive sensor, an infrared sensor, or an ultrasonic sensor that is configured to provide sensing field 406. Examples of suitable proximity sensors include GESTIC sensors from Microchip Technology Inc. In some cases, proximity sensor 403 may be disposed in a matrix of similar elements on proximity sensing layer 103C, and each proximity sensor may be located under a respective key of electromechanical layer 103A.

In this example, assume that the user's finger or fingertip 404 is resting at position 407 relative to proximity sensing layer 103C. When finger 404 travels by a selected or configurable distance 409 (in the vertical axis "z") to position 408 from proximity sensing layer 103C, the disturbance caused by the user's finger 404 upon sense field 406 triggers detection of a hovering keypress corresponding to keycap 401—without finger 404 having to touch keycap 401.

In some cases, height 407 may be configured to become aligned with the height of keycap 401, shown here as height 410. In that case, a hovering keypress can be detected when key cap 401 travels by distance 409 (e.g., 1 mm or 2 mm) from its initial position—a shorter travel distance (and less force) than a physical keypress would require.

In some implementations, the flickering or snapping action of a fingertip by travel distance 409 may be interpreted as a hovering keystroke. An initial value (e.g., 2 mm) for travel distance 409 may be set during a calibration or training phase. Thereafter, in order to detect hovering keystrokes with reduced latency, processor 201 and/or 300 may be configured to predict hovering keypresses based upon the user's behavior.

Figure 5A:
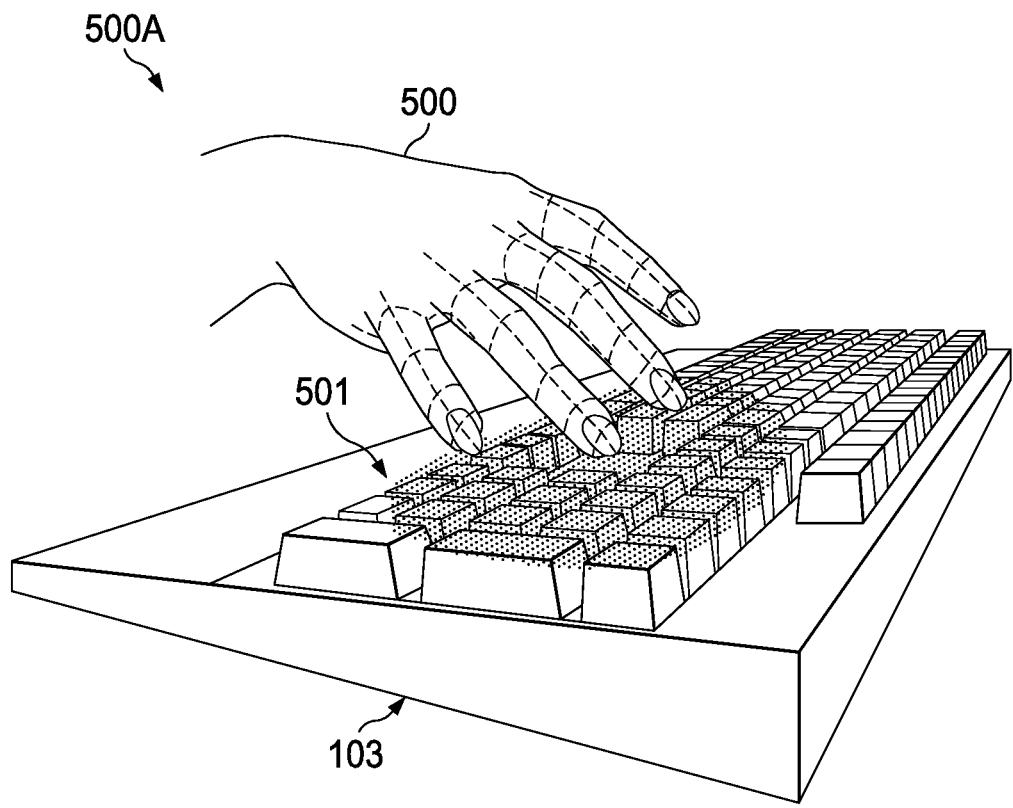
FIGS. 5A and 5B are diagrams of a hovering keyboard being used to detect hand gestures, according to some embodiments.
Figure 5B:
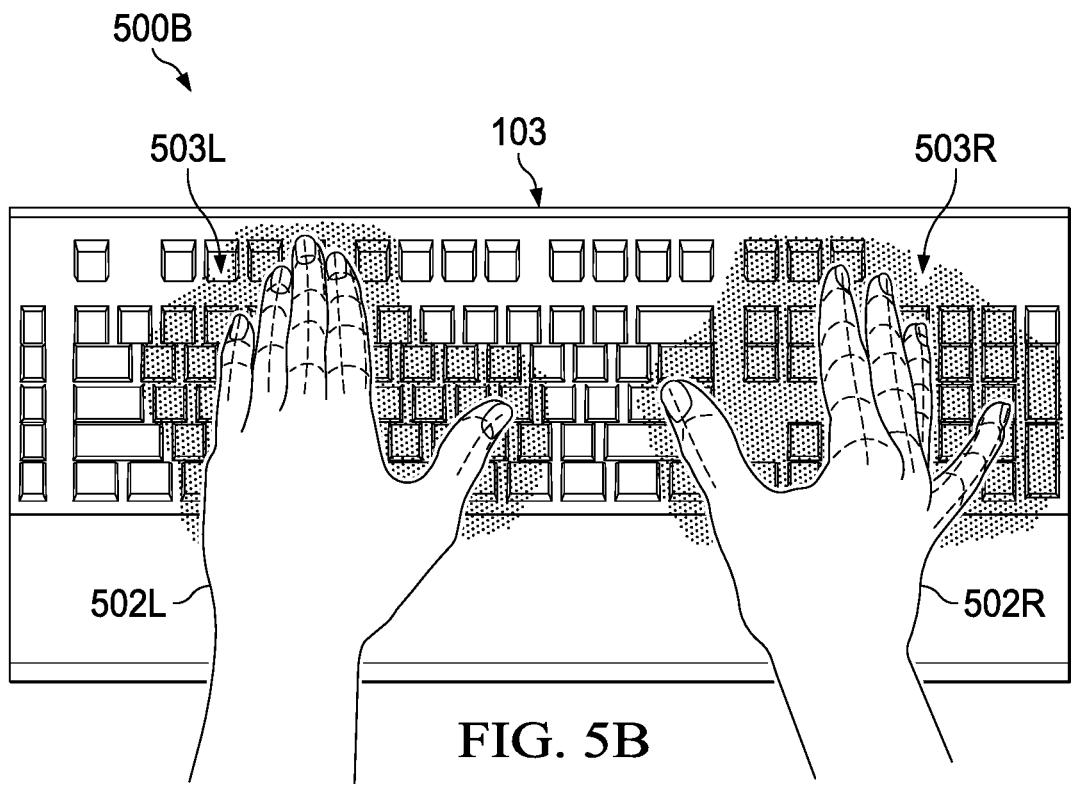

FIGS. 5A and 5B show hovering keyboard 103 being used to detect hand gestures according to some embodiments. Particularly, in configuration 500A, a user's hand 500 hovers over keyboard 103 and performs a single-handed gesture (e.g., a swiping gesture) in the position indicated by light pattern 501. Different colors and/or brightness settings may be applied to light pattern 501 under selected keycaps, for example, to guide a user's hand to a proper position.

For instance, selected key caps may light up with an intensity proportional to the distance between the hand and those keys, such that the amount of light increases (or the color changes) as the user moves hand 500 toward those keys. Then, the same lights (or all lights) may blink a number of times when the user reaches the proper position for detection, or when a gesture sequence is recognized. As a person of ordinary skill in the art will recognize, however, other suitable lighting patterns or instructions may be used.

Configuration 500B of FIG. 5B shows left hand 50IL and right hand 501R resting over hovering keyboard 103 above light patterns 503L and 503R, respectively. In this case, areas 503L and 503R indicate expected or identified two-handed gestures (e.g., two concurrent swipes). Moreover, the IHS may light up selected keys 503L and 503R corresponding to the position of hands 501L and 501R over hovering keyboard 103, such that each of the selected keys is lit with a color and/or a brightness corresponding to a current distance between a portion of the hand above the selected keys and the hovering keyboard 103.

Figure 6:
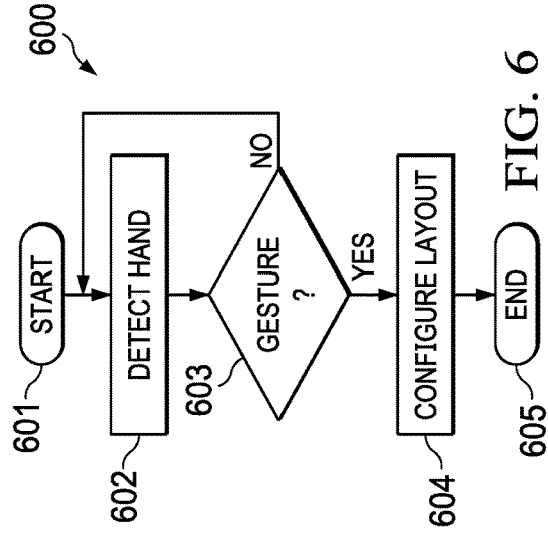
FIG. 6 is a flowchart of a method for configuring the layout of a hovering keyboard using gestures, according to some embodiments.

FIG. 6 is a flowchart of method 600 for configuring the layout of a hovering keyboard using gestures, according to some embodiments. In various implementations, program instructions for executing method 600 may be stored in memory 205 and are executable by processor(s) 201. In some cases, method 600 may be performed by one or more standalone software applications, drivers, libraries, or toolkits, accessible via an Application Programming Interface (API) or the like. Additionally, or alternatively, method 600 may be performed by the IHS's OS.

Method 600 begins at block 601. At block 602, method 600 begins detecting the user's hand(s) using proximity sensors 403 while the user performs single handed or two-handed gestures, physical keystrokes, or hovering keystrokes. Generally, detection begins when proximity sensor data is received at IHS 100 from proximity sensing layer 103C of hovering keyboard 103. In some implementations, proximity sensor data may be processed, to some degree, by keyboard controller 300. Then, the proximity sensor data may be further processed by processor(s) 201.

For example, proximity signals that exhibit above-threshold distances and/or motion over a suitable time interval are collected, and then processor(s) 201 attempts to match the captured proximity sensor data to a geometric model of a user's hand. If a suitable match is found, then the hand may be recognized as that of the corresponding user.

In some embodiments, processor(s) 201 be configured to analyze proximity signals from each distinct sensor in order to determine what part of the user's hand each signal represents. A number of different hand-part assignment techniques may be used. For instance, each signal may be assigned a hand-part index. The hand-part index may include a discrete identifier, confidence value, and/or hand-part probability distribution indicating the hand part or parts to which that signal is likely to correspond.

Machine learning may be used to assign each signal a hand-part index and/or hand-part probability distribution. A machine-learning module may analyze a user's hand with reference to information learned from a previously trained collection of known hands and/or hand features.

During a training phase, a variety of hand positions may be observed, and trainers may label various classifiers in the observed data. The observed data and annotations may then be used to generate one or more machine-learned algorithms that map inputs (e.g., observation data from proximity sensors) to desired outputs (e.g., hand-part indices for relevant signals).

Thereafter, a partial virtual skeleton may be fit to at least one hand part identified. In some embodiments, a hand-part designation may be assigned to each skeletal segment and/or each joint. Such virtual skeleton may include any type and number of skeletal segments and joints, including each individual finger.

In some embodiments, each joint may be assigned a number of parameters, such as, for example, Cartesian coordinates specifying its position, angles specifying its rotation, and other parameters (e.g., open hand, closed hand, length, width, joint position, angle of joint rotation, and a description of any finger segment). Then, a virtual skeleton may be fit to each of a sequence of hand parts identified from the proximity sensor data.

At block 603, method 600 determines whether a gesture is being or has been performed. For example, a "gesture" may have a Start phase (S) with a standalone gesture, a motion phase (M) with a sequence of gestures following each other, and an end phase (E) with another standalone gesture. In some embodiments, a look-up table may be used to store key attributes and/or reference images of start, motion, and end phases for each gesture sequence to be recognized, for two-handed and one-handed cases. As used herein, the term "look-up table" or "LUT" refers to an array or matrix of data that contains items that are searched. In many cases, an LUT may be arranged as key-value pairs, where the keys are the data items being searched (looked up) and the values are either the actual data or pointers to where the data are located.

The training phase may store user-specific finger/hand attributes (e.g., asking user 101 to splay fingers), such as motion velocity or asynchrony. For example, a start or end phase LUT may be created to include reference images or attributes, whereas a motion phase LUT may be created to include relative 6-axes data. The amount of time a user has to hold their hands and/or fingers in position for each phase of gesture sequence (S, M, and E) may be configurable.

In block 604, if a hand gesture is recognized, method 600 configures one or more layout aspects of hovering keyboard 103, and method ends at block 605. Otherwise, if the gesture is not recognized in block 603, control returns to block 602.

Examples of keyboard layout configuration operations include, but are not limited to: enabling or disabling physical keypresses over selected keycaps or zones, enabling or disabling hovering keypresses over selected keycaps or zones, enabling or disabling gesture detection over selected keycaps or zones, enabling or disabling keyboard illumination or lighting event under selected keycaps or zones, mapping keys to selected commands (e.g., according to the user's preferences, an application being executed, etc.).

Figure 7:
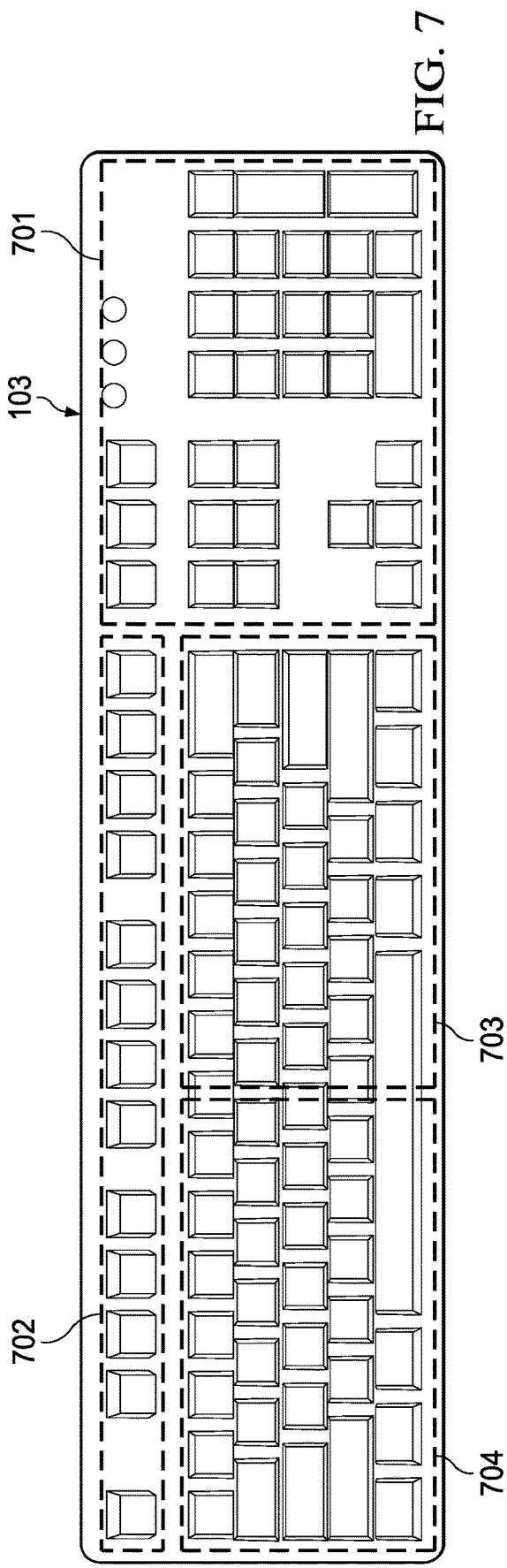
FIG. 7 is a diagram of different zones of a hovering keyboard, according to some embodiments.

FIG. 7 is a diagram of different zones of hovering keyboard 103. In some embodiments, hovering keyboard 103 includes number pad zone 701, "f-key" zone 702, right side 703, and left side 704. In other embodiments, however, any number of zones may be configured with any subset of key caps as part of a layout configuration operation.

In various implementations, a user may configure any of zones 701-704 to perform gesture detection, physical keystroke detection, hovering keystroke detection, or any combination thereof. Additionally, or alternatively, each zone may be enabled or disabled to process selected gestures, to the exclusion of other gestures. For example, zone 703 may be configured to detect right swiping or waving gestures only, and zone 704 may be configured to detect left swiping or waving gestures only.

For sake of illustration, consider an implementation example where right side 703 of keyboard 103 is configured to map swiping gestures into a first command (e.g. a right shift or arrow), and left side 704 is configured to map swiping gestures into a second command (e.g. a left shift or arrow). In that manner, a user can control different aspects of a slideshow application, for example, using hovering gestures, at the same time as physical keystrokes (and/or hovering keystrokes) are received. The physical keystrokes may be mapped to the same application, or to any other application.

In some implementations, each of zones 701-704 may be selectively illuminated using backlight illumination layer 103B under respective keycaps to help a user visualize the different zones. For example, each of zones 701-704 may light up with a different color in response to a user's command, or during execution of a zone configuration tool.

Figure 8:
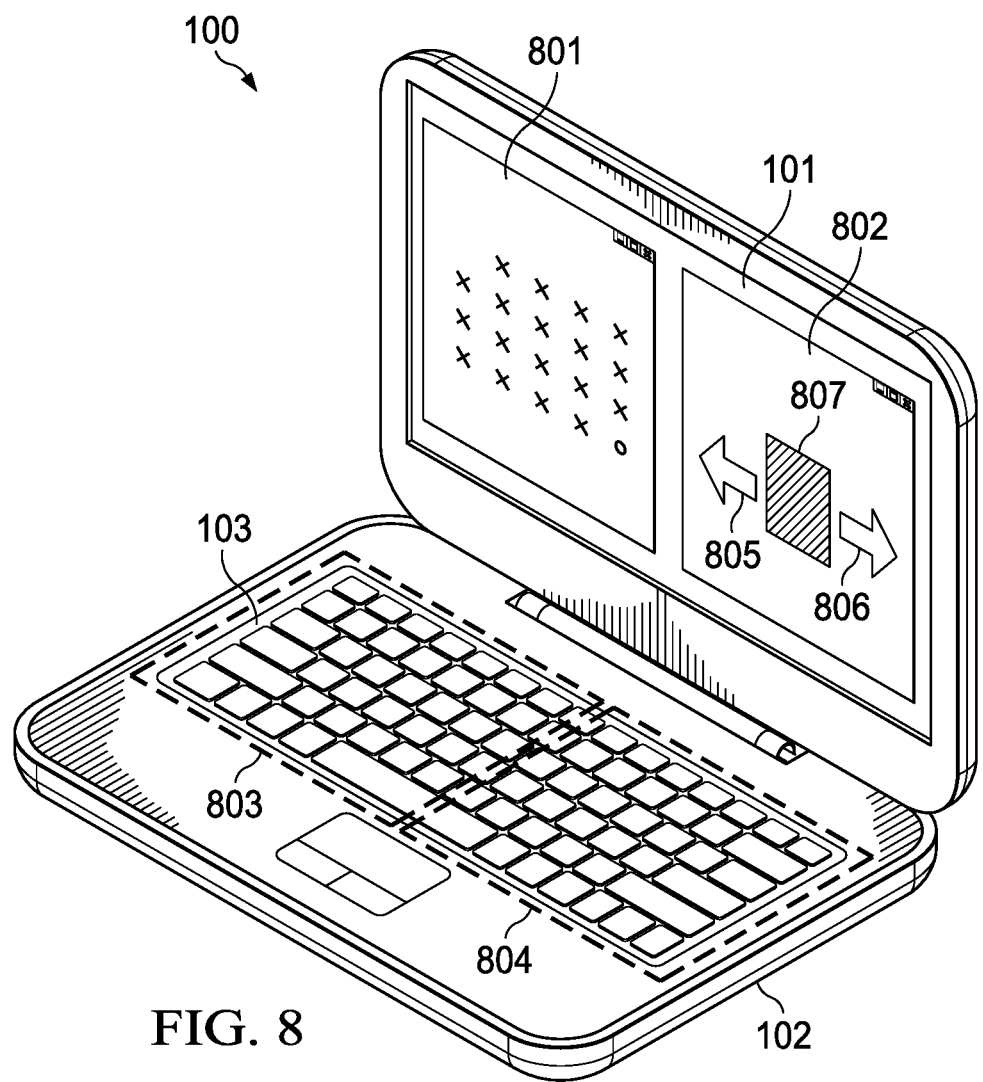
FIG. 8 is a diagram of a configuration example, according to some embodiments.

FIG. 8 is a diagram of a configuration example. In this example, physical keystrokes detected by hovering keyboard 103 may be mapped to first application 801. For example, first application 801 may be a document processor or web browser.

Hovering keyboard 103 may also be split into two zones, left zone 803 and right zone 804. In some cases, a swiping gesture detected on right zone 804 may be translated into a next page or forward command in first application 801, whereas a swiping gesture detected on left zone 803 may be translated into a previous page or backward command in first application 801.

In other cases, however, a swiping gesture detected on right zone 804 may be translated into a next page or forward command 806 in second application 802, and a swiping gesture detected on left zone 803 may be translated into a previous page or backward command 805 in application 802. For example, second application 802 may be a slideshow, and commands 805 and 806 let the user navigate different media items 807. Meanwhile, hovering keyboard 103 may continue to map physical and/or hovering keystrokes to first application 801.

In some cases, a hovering keyboard 103 may have physical keystrokes mapped to a first application, hovering keystrokes mapped to a second application, and hand gestures mapped to a third application. In some cases, one or more of these applications may be rendered in an external display coupled to IHS 100.

In other cases, hand gestures may themselves be used to configure layout aspects of hovering keyboard 103. For instance, gestures may be used to enable or disable hovering keystroke detection in or more zones, to reconfigure or remap f-keys to custom commands, to enable or disable keys, to change the keyboard layout, to set a keypress latency adjustment, to set a hovering parameter or distance (407-410), to change a light pattern or to customize colors or light intensity, to toggle between different operating modes of a foldable or 2-in-1 IHS (e.g., to toggle between keyboard and "surface" to write notes back and forth in a dual display device), etc.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
    a processor; and
    a memory coupled to the processor, the memory having program instructions stored thereon that, upon execution by the processor, cause the IHS to:
        detect a hand gesture using proximity sensors disposed on a keyboard coupled to the IHS, at least in part, by fitting proximity data obtained by the proximity sensors to a partial virtual skeleton of the hand having one or more parameters selected from the group consisting of: a length, a width, a joint position, an angle of joint rotation, and a finger segment; and
        configure a layout of the keyboard based on the detection.

2. The IHS of claim 1, wherein the hand gesture comprises a swipe.

3. The IHS of claim 1, wherein to configure the layout, the program instructions, upon execution, further cause the IHS to map a key selected by a user to a corresponding command.

4. The IHS of claim 1, wherein to configure the layout, the program instructions, upon execution, further cause the IHS to detect hovering keystrokes to the exclusion of physical keystrokes.

5. The IHS of claim 1, wherein to configure the layout, the program instructions, upon execution, further cause the IHS to detect physical keystrokes to the exclusion of hovering keystrokes.

6. The IHS of claim 1, wherein to configure the layout, the program instructions, upon execution, further cause the IHS to detect physical keystrokes and hovering keystrokes concurrently.

7. The IHS of claim 1, wherein to configure the layout, the program instructions, upon execution, further cause the IHS to map a first hovering keystroke over a first keycap to a first application executed by the IHS, and to map a second hovering keystroke over a second keycap to a second application executed by the IHS.

8. The IHS of claim 7, wherein the first application is rendered on a display integrated into the IHS, and wherein the second application is rendered on an external display.

9. The IHS of claim 1, wherein to configure the layout, the program instructions, upon execution, further cause the IHS to map a hovering keystroke over a given keycap to a first application executed by the IHS, and to map a physical keystroke of the given keycap to a second application executed by the IHS.

10. The IHS of claim 1, wherein to configure the layout, the program instructions, upon execution, further cause the IHS to enable hovering keystrokes over a first subset of keycaps and disable hovering keystrokes over a second subset of keycaps.

11. The IHS of claim 1, wherein to configure the layout, the program instructions, upon execution, further cause the IHS to enable or disable a lighting effect provided via a backlight illumination layer of the keyboard.

12. A method, comprising:
    detecting a hand gesture using proximity sensors disposed on a keyboard coupled to an Information Handling System (IHS), at least in part, by fitting proximity data obtained by the proximity sensors to a partial virtual skeleton of the hand having one or more parameters selected from the group consisting of: a length, a width, a joint position, an angle of joint rotation, and a finger segment; and
    configuring a layout of the keyboard based on the detection.

13. The method of claim 12, wherein configuring the layout further comprises configuring the keyboard to detect one of: (i) hovering keystrokes only, (ii) physical keystrokes only, or (iii) physical keystrokes and hovering keystrokes concurrently.

14. The method of claim 12, wherein configuring the layout further comprises mapping a hovering keystroke over a given keycap to a first application executed by the IHS and mapping a physical keystroke of the given keycap to a second application executed by the IHS.

15. The method of claim 12, wherein configuring the layout comprises enabling hovering keystrokes over a first a subset of keycaps and disabling hovering keystrokes over a second subset of keycaps.

16. The method of claim 12, wherein configuring the layout comprises selecting a color or an intensity of a light provided by a backlight illumination layer of the keyboard.

17. A hardware memory device having program instructions stored thereon that, upon execution by a processor of an Information Handling System (IHS), cause the IHS to:
  detect a hand gesture using proximity sensors disposed on a keyboard coupled to the IHS, at least in part, by fitting proximity data obtained by the proximity sensors to a partial virtual skeleton of the hand having one or more parameters selected from the group consisting of: a length, a width, a joint position, an angle of joint rotation, and a finger segment; and
  configure a layout of the keyboard based on the detection.

* * * * *